G. S. GUNDERSON.
FOOT ACCELERATOR FOR FORD AUTOMOBILE ENGINES.
APPLICATION FILED AUG. 31, 1914.
1,157,099.
Patented Oct. 19, 1915.
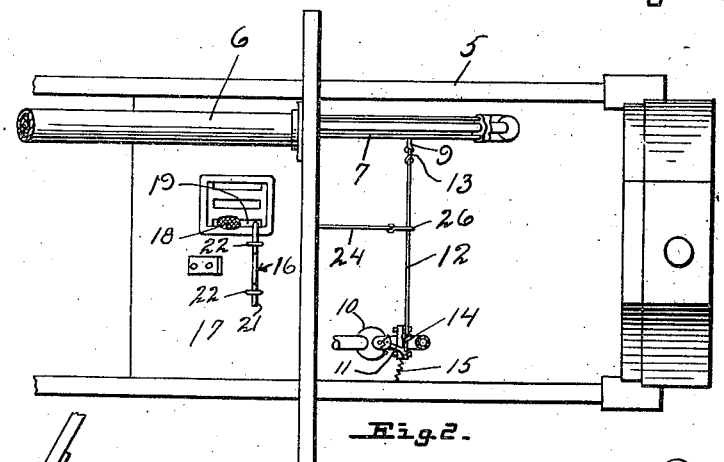
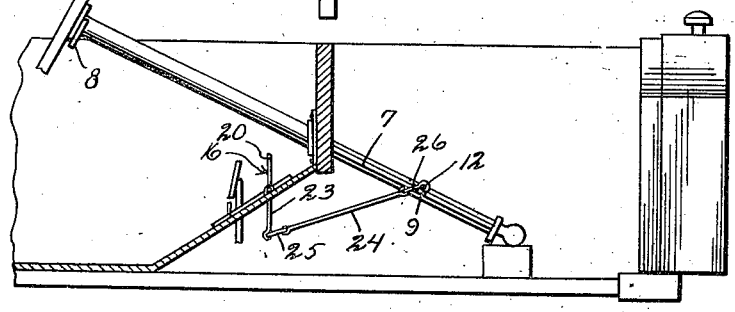
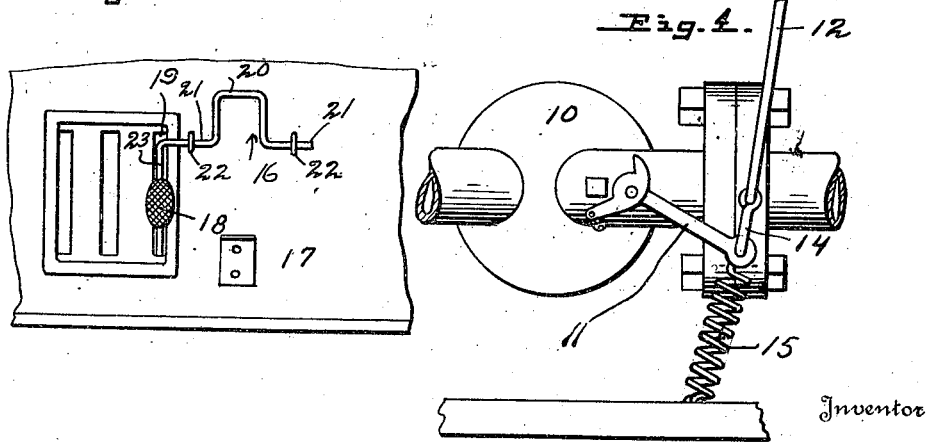
Inventor
G. S. Gunderson.
Witnesses
By 
Attorney

UNITED STATES PATENT OFFICE.

GILBERT S. GUNDERSON, OF COLFAX, WISCONSIN.

FOOT-ACCELERATOR FOR FORD AUTOMOBILE-ENGINES.

1,157,099.  Specification of Letters Patent.  Patented Oct. 19, 1915.

Application filed August 31, 1914. Serial No. 859,473.

*To all whom it may concern:*

Be it known that I, GILBERT S. GUNDERSON, a citizen of the United States, residing at Colfax, in the county of Dunn, State of Wisconsin, have invented certain new and useful Improvements in Foot-Accelerators for Ford Automobile-Engines; and I do hereby declare the following to be a full, clear, and exact description of the invention, such as will enable others skilled in the art to which it appertains to make and use the same.

This invention relates to carbureter control devices for automobiles, particularly to a device of this character specially adapted for Ford automobiles, and has for its object the provision of means whereby the throttle may be controlled either by hand or by foot or both.

An important object is the provision of means of this character whereby the throttle may be opened and kept open the required degree by the hand lever already provided and whereby the throttle may be opened to an additional extent by pressing upon a foot lever to accelerate the speed of the engine.

Another object is the provision of a foot accelerator device of this character which will be simple and inexpensive in manufacture and installation, efficient and durable in service, easy in operation and a general improvement of the art.

With these and other objects and advantages in view, my invention consists in the novel construction and arrangement of parts as will be hereinafter more fully described and claimed, and illustrated in the accompanying drawing, in which—

Figure 1 is a plan view of a portion of a Ford automobile frame showing my device applied thereto. Fig. 2 is a longitudinal sectional view. Fig. 3 is a cross sectional view through the floor of the automobile adjacent the dash showing the foot pedal operating my device, and Fig. 4 is a cross sectional view through the front portion of the automobile showing my device associated with the throttle lever rod arm.

Referring more particularly to the drawing, the numeral 5 designates a portion of the frame of a Ford automobile upon which is mounted the usual steering post 6 having the throttle lever rod 7 extending therealong and provided with the usual handle 8 at the wheel. An arm 9 extends from the rod 7.

The numeral 10 designates the carbureter provided with the usual throttle arm 11. The present system of throttle control involves the use of a rod or link connected with the arm 9 and with the throttle arm 11, whereby movement of the handle 8 will open or close the throttle for regulating the speed of the engine. Many drivers find it annoying and inconvenient to control the throttle by hand only. It is with this objection in view, that my invention has been designed which contemplates the provision of pedal operated means for shifting the position of the throttle arm 11 independently of or together with the handle 8. In order to accomplish this result I remove the usual rod or link connecting the arms 9 and 11 and substitute therefor a flexible member 12 which may be a chain or wire cable and which is provided upon its ends with hooks 13 and 14 connected with the arms 9 and 11 respectively on the rod 7 and the carbureter. To the throttle arm 11 I also connect a spring 15 which has its other end connected with the frame 5 for normally holding the throttle closed.

The operation of the device to this point, is as follows: In order to open the throttle for increasing the speed of the engine it is merely necessary to move the hand lever 8 in the usual manner whereupon the rotation of the rod 7 will rock the arm 9 thereon and by virtue of the flexible member 12 will open the throttle by moving the arm 11. The usual notches in the segment underlying the handle 8 will hold the handle sufficiently securely that the spring 15 will not be able to close the throttle.

In order to provide a foot accelerator whereby the speed of the engine may be increased without moving the handle 8, I secure a pedal 16 upon the floor 17 of the automobile adjacent the brake pedal 18 which extends through the slot 19. This pedal may be formed in any desired manner though I have shown it as an upstanding loop 20, formed of a rod and having horizontal arms 21 pivotally secured upon the floor by screw eyes 22 or the like. One of the arms 21 is bent downwardly and extends through the slot 19 in advance of the brake pedal 18 forming an arm 23. A flexible member or rod 24 is connected with the lower end of the arm 23 by any suitable hook 25 and is connected with the flexible member 12 by a hook 26.

The engine being running at any desired speed in accordance with the degree of throttle opening set by the handle 8, if it is desired to accelerate the speed of the engine without changing the position of the handle 8, as upon reaching a hill, it is merely necessary to press upon the pedal 16, whereupon the arm 23 will be moved rearwardly, pulling the flexible member 24 rearwardly and pulling upon the flexible member 12, thereby moving the throttle arm 11 and opening the throttle to feed more gas to the engine. Upon removing the foot from the pedal 16, the spring 15 will return the throttle arm 11 to the position which it was in before the pedal 16 was depressed, the throttle then remaining at the position in which it was set by the movement of the handle 8.

From the foregoing description and a study of the drawing it will be apparent that I have thus provided a novel and simple device actuated by the operator's foot whereby the speed of the engine may be increased without changing the position of the handle 8. If desired, the handle 8 may be moved into its entirely shut off position and the throttle be controlled entirely by the operator's foot upon the pedal 16.

Although I have shown the pedal 16 as formed in a specific manner, and the various hooks connected with the flexible members as being formed of a certain shape, it will be readily understood that I may make various changes in the details of construction and arrangement of these parts without in any manner departing from the spirit of the invention or limiting the scope of the subjoined claim.

Having thus described my invention, I claim:

In an accelerator for automobiles, the combination with an explosive engine including a carbureter and throttle arm, of a rotatable control rod, an arm on said control rod, a flexible and pliable connection between the throttle arm and the arm on the control rod, means for normally holding the throttle arm in position to close the throttle, a rotatable crank shaft extending substantially parallel to the flexible and pliable connection, a link connecting said shaft and the flexible and pliable connection whereby rotation of the shaft will exert a force on said connection transversely of the latter and draw the ends thereof together, and foot operated means for rotating the crank shaft.

In testimony whereof, I affix my signature, in the presence of two witnesses.

GILBERT S. GUNDERSON.

Witnesses:
  GEO. T. VORLAND,
  ALICE EMERSON.